United States Patent
Birke et al.

(10) Patent No.: US 10,481,955 B2
(45) Date of Patent: Nov. 19, 2019

(54) OPTIMIZING TAIL LATENCY VIA WORKLOAD AND RESOURCE REDUNDANCY IN CLOUD

(71) Applicant: International Business Machines Corporation, Armonk, NY (US)

(72) Inventors: Robert Birke, Kilchberg (CH); Mathias Bjoerkqvist, Rueschlikon (CH); Yiyu L. Chen, Thalwil (CH); Martin L. Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 15/268,610

(22) Filed: Sep. 18, 2016

(65) Prior Publication Data

US 2018/0081737 A1    Mar. 22, 2018

(51) Int. Cl.
*G06F 9/50*    (2006.01)

(52) U.S. Cl.
CPC ............ *G06F 9/5083* (2013.01); *G06F 9/505* (2013.01); *G06F 9/5061* (2013.01)

(58) Field of Classification Search
CPC ....... G06F 9/5083; G06F 9/505; G06F 9/5061
See application file for complete search history.

(56) References Cited

U.S. PATENT DOCUMENTS

| | | | |
|---|---|---|---|
| 9,002,939 B2 | 4/2015 | Laden | |
| 2014/0075030 A1 | 3/2014 | Wang | |
| 2014/0229608 A1 | 8/2014 | Bauer | |
| 2017/0262191 A1* | 9/2017 | Dewakar | ............... G06F 3/0611 |

OTHER PUBLICATIONS

Wu et al. CosTLO: Cost-Effective Redundancy for Lower Latency Variance on Cloud Storage Services. [online] (May 6, 2015). Usenix., pp. 543-557. Retrieved From the Internet <https://www.usenix.org/system/files/conference/nsdi15/nsdi15-paper-wu.pdf> (Year: 2015).*

Hague et al. Few-to-Many: Incremental Parallelism for Reducing Tail Latency in Interactive Services. [online] (Mar. 18, 2015). pp. 1-15. Retrieved From the Internet <https://www.microsoft.com/en-us/research/wp-content/uploads/2016/02/FINAL-asplos168-haqueA.pdf> (Year: 2015).*

Ashish Vulimiri et al., Low Latency via Redundancy. CoNEXT'13, Dec. 9-12, 2013. pp. 283-294.

Rui Han et al., PCS: Predictive Component-level Scheduling for Reducing Tail Latency in Cloud Online Services. 2015 44th International Conference on Parallel Processing (ICPP). Sep. 1-4, 2015 pp. 490-499.

(Continued)

*Primary Examiner* — Emerson C Puente
*Assistant Examiner* — Jonathan R Labud
(74) *Attorney, Agent, or Firm* — Daniel P. Morris; Otterstedt, Wallace & Kammer, LLP (57) ABSTRACT

A plurality of requests are received for computing processing. At least some of the plurality of requests are replicated. The requests are replicated based on a fractional replication factor. Each received request and each replicated request are transmitted to a computer resource for processing. At least some embodiments provide the capability for meeting tail latency targets with improved performance and reduced cost.

17 Claims, 5 Drawing Sheets

(56) References Cited

OTHER PUBLICATIONS

Zeqi Lai et al., TailCutter: Wisely Cutting Tail Latency in Cloud CDN under Cost Constraints. Computer Communications, IEEE INFOCOM 2016—The 35th Annual IEEE International Conference on Apr. 10-14, 2016 . pp. 1-9.
CosTLO: cost effective redundancy for lower latency variance on cloud storage services. Proceeding NSDI'15 Proceedings of the 12th USENIX Conference on Networked Systems Design and Implementation. May 4-6, 2015 Online Abstract pp. 1-2 plus pp. 543-557.

* cited by examiner

OPTIMIZING TAIL LATENCY VIA WORKLOAD AND RESOURCE REDUNDANCY IN CLOUD

BACKGROUND

The present invention relates to techniques for providing the capability for computing systems to meet tail latency targets using workload redundancy and resource redundancy.

Cloud computing is a type of network-based computing that provides shared processing resources and data to computers and other devices on demand. Computing and storage resources located in the cloud provide users with the capability to store and process their data in data centers that are typically, owned, operated, and maintained by third-parties. One common service provided by cloud computing is hardware virtualization. With hardware virtualization, virtual computing resources, such as complete computers, or portions of computers, can be provided in the cloud using what are known as virtual machines.

One issue with hardware virtualization is the provisioning of sufficient resources to provide adequate performance. Typically, performance targets are specified in contracts known as cloud service level agreements (CSLAs). One important performance target that is often specified in CSLAs is known as the tail latency. The tail latency may specify that the latency, or time delay experienced in using the system, should be less than a certain target value 95 percent of the time. To meet such a target, it is typical to provision a large amount of resources, such as virtual machines, to service each user. However, this solution can be very costly because typically a large number of virtual machines must be provisioned. This leads to low resource efficiency as the cluster utilization is low. Further, increasing the number of virtual machines may not be sufficient as the increased number of virtual machines may not always able to meet the target.

Accordingly, a need arises for techniques by which tail latency targets may be met with improved performance and reduced cost.

SUMMARY

Embodiments of the present invention may provide the capability for meeting tail latency targets with improved performance and reduced cost. For example, embodiments may utilize the concept of double redundancy, which may combine both resource redundancy and workload redundancy. Resource redundancy may involve providing additional computing resources, such as virtual machines. Workload redundancy may involve replicating request for computing services and transmitting the replicated requests to multiple virtual machines. Given multiple requests, fractional workload redundancy may be utilized, in which different requests are replicated different amounts. The workload redundancy, as well as the resource redundancy, may be controlled based on a proactive, speculative strategy. Increasing workload redundancy (replicating requests) may be utilized to lower the tail latency in a cost effective way.

For example, in an embodiment of the present invention, a computer-implemented method for performing computing processing may comprise receiving a plurality of requests for computing processing, replicating at least some of the plurality of requests, wherein the requests are replicated based on a fractional replication factor, and transmitting each received request and each replicated request to a computer resource for processing.

In an embodiment, the replicating may be performed by a process selected from a group of processes comprising replicating selected requests, wherein the requests are selected based on a replication factor, replicating requests a number of times on average based on a randomly generated quantity, replicating each request with a different frequency, replicating requests stochastically by building a probability distribution having only integer values with an average equal to the fractional replication factor and determining a replication factor for each request based on the probability distribution, and replicating requests deterministically by defining a sequence of replication factors with an average equal to the fractional replication factor and determining a replication factor for each request based on the sequence. The method may further comprise determining a tail latency for performing the requested computing processing and increasing the fractional replication factor when the determined tail latency does not meet a target tail latency. The method may further comprise decreasing the fractional replication factor when the determined tail latency meets the target tail latency. The method may further comprise increasing computing resources provisioned to perform the processing when the when the determined tail latency does not meet the target tail latency and increasing the fractional replication factor does not result in a decrease in the determined tail latency. The computing resources may comprise at least one of a virtual machine or a server. The method may further comprise decreasing the fractional replication factor when the determined tail latency meets the target tail latency and decreasing the computing resources provisioned to perform the processing when the when the fractional replication factor has been decreased and increasing the provisioned computing resources have been increased.

As another example, in an embodiment of the present invention, a computer program product for performing computing processing may comprise a non-transitory computer readable storage having program instructions embodied therewith, the program instructions executable by a computer, to cause the computer to perform a method comprising receiving a plurality of requests for computing processing, replicating at least some of the plurality of requests, wherein the requests are replicated based on a fractional replication factor, and transmitting each received request and each replicated request to a computer resource for processing.

As another example, in an embodiment of the present invention, a system for performing computing processing may comprise a processor, memory accessible by the processor, and computer program instructions stored in the memory and executable by the processor to perform receiving a plurality of requests for computing processing, replicating at least some of the plurality of requests, wherein the requests are replicated based on a fractional replication factor, and transmitting each received request and each replicated request to a computer resource for processing.

As another example, in an embodiment of the present invention, a system for performing computing processing may comprising a plurality of computing resources adapted to perform computing processing and a load replicator adapted to receive a plurality of requests for computing processing, replicate at least some of the plurality of requests, wherein the requests are replicated based on a fractional replication factor, and transmit each received request and each replicated request to a computer resource for processing.

In an embodiment, the replicating may be performed by a process selected from a group of processes comprising replicating selected requests, wherein the requests are selected based on a replication factor, replicating requests a number of times on average based on a randomly generated quantity, replicating each request with a different frequency, replicating requests stochastically by building a probability distribution having only integer values with an average equal to the fractional replication factor and determining a replication factor for each request based on the probability distribution, and replicating requests deterministically by defining a sequence of replication factors with an average equal to the fractional replication factor and determining a replication factor for each request based on the sequence. The load replicator may be further adapted to determine a tail latency for performing the requested computing processing and increase the fractional replication factor when the determined tail latency does not meet a target tail latency, and decrease the fractional replication factor when the determined tail latency meets the target tail latency. The load replicator may be further adapted to increase computing resources provisioned to perform the processing when the when the determined tail latency does not meet the target tail latency and increasing the fractional replication factor does not result in a decrease in the determined tail latency, decrease the fractional replication factor when the determined tail latency meets the target tail latency, and decrease the computing resources provisioned to perform the processing when the when the fractional replication factor has been decreased and increasing the provisioned computing resources have been increased, wherein the computing resources comprise at least one of a virtual machine or a server.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide the capability for meeting tail latency targets with improved performance and reduced cost. For example, embodiments may utilize the concept of double redundancy, which may combine both resource redundancy and workload redundancy. Resource redundancy may involve providing additional computing resources, such as virtual machines. Workload redundancy may involve replicating request for computing services and transmitting the replicated requests to multiple virtual machines. Given multiple requests, fractional workload redundancy may be utilized, in which different requests are replicated different amounts. The workload redundancy, as well as the resource redundancy, may be controlled based on a proactive, speculative strategy. Increasing workload redundancy (replicating requests) may be utilized to lower the tail latency in a cost effective way.

Figure 1:
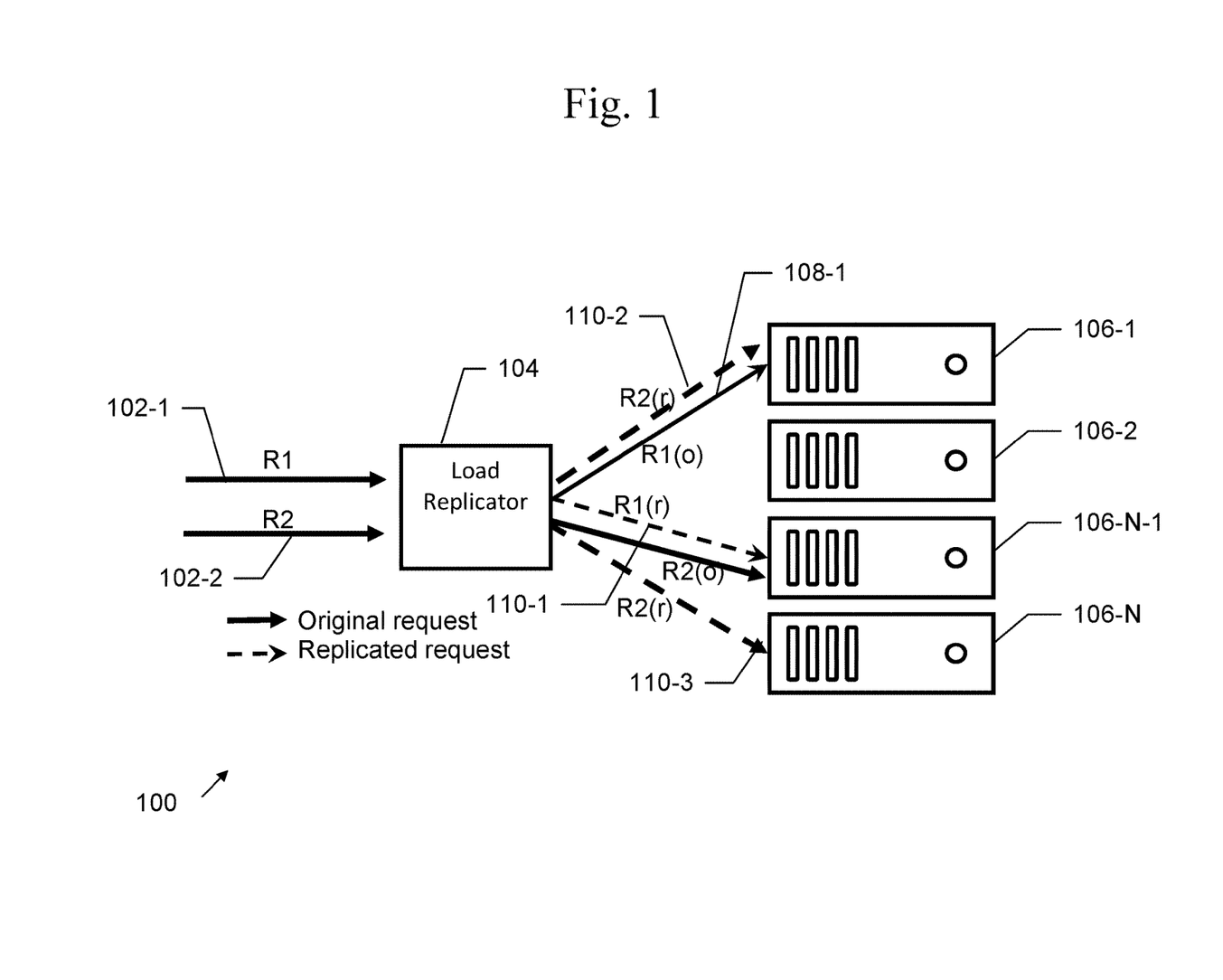
FIG. 1 is an exemplary block diagram of a computing system in which an embodiment of the present invention may be implemented.

An exemplary system 100 in which an embodiment of the present invention may be implemented is shown in FIG. 1. System 100 may include a plurality of incoming computing requests, such as requests R1 102-1 and R2 102-2, a load replicator 104, and a plurality of computing resources 106-1 to 106-N. Requests R1 102-1 and R2 102-2 may include requests for computing services such as application services, database services, transactional services, etc. Computing resources 106-1 to 106-N may include hardware resources, such as server computer systems, and software resources, such as virtual machine instances, etc. It is to be noted that the listed types of requests for computing services and the listed types of computing resources are merely examples. The present invention contemplates application to any type of request for computing services and to any type of computing resources.

Load replicator 104 may receive incoming computing requests, such as requests R1 102-1 and R2 102-2, may transmit those original requests, such as requests R1(o) 108-1 and R2(o) 108-2, to one or more computing resources 106-1 to 106-N. Likewise, load replicator 104 may replicate one or more incoming requests, such as requests R1 102-1 and R2 102-2, and may transmit the replicated requests, such as requests R1(r) 110-1 and R2(r) 110-2, 110-3, to one or more computing resources 106-1 to 106-N. In this example, load replicator 104 is implementing a workload replication factor of 2.5. Load replicator 104 may transmit two copies of request R1, original request R1 102-1 and replicated request R1(r) 110-1, and load replicator 104 is transmitting three copies of request R2, original request R2 102-2 and replicated requests R2(r) 110-2, 110-3. Accordingly, the original two requests may be replicated to form five total requests, which achieves a workload replication factor of 2.5.

Figure 2:
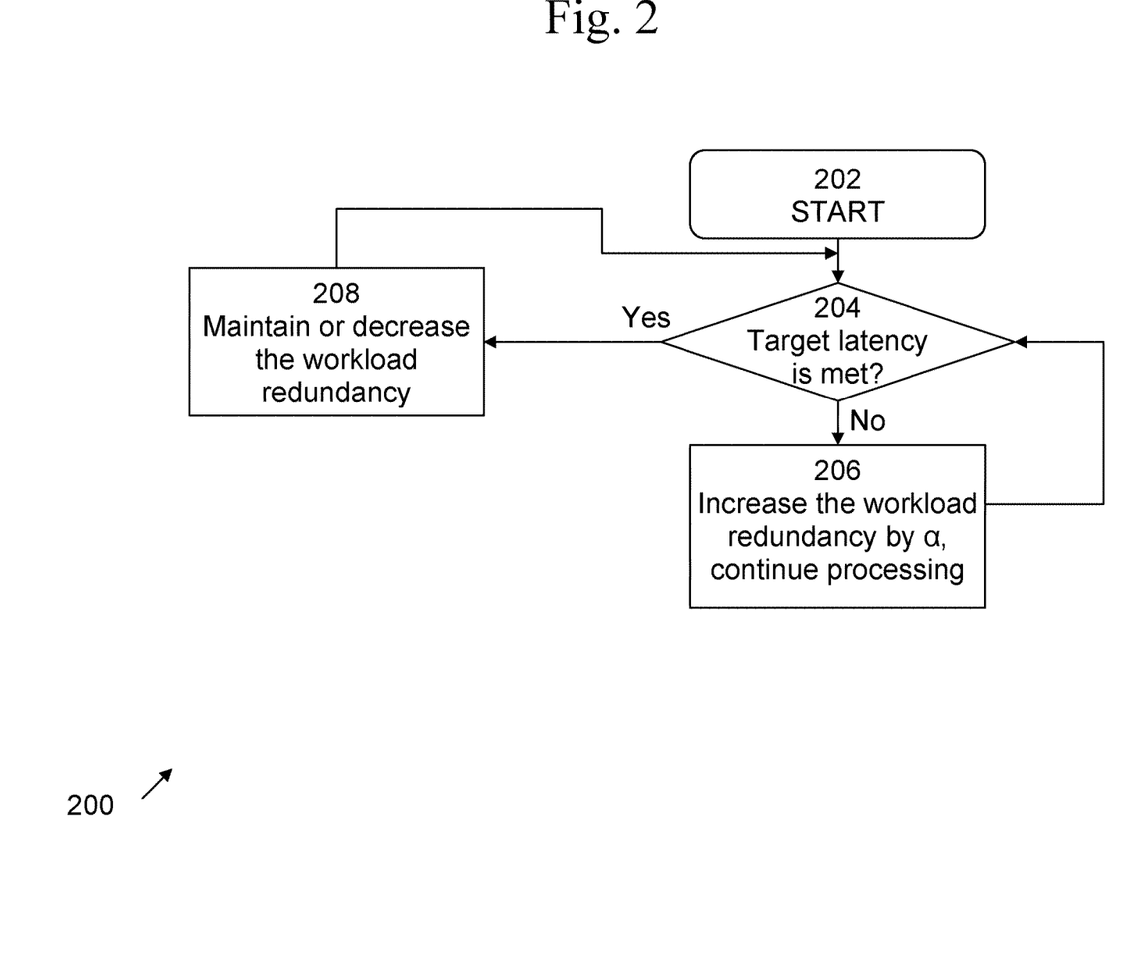
FIG. 2 is an exemplary flow diagram of a process for providing workload redundancy in the computing system shown in FIG. 1.

An exemplary flow diagram of a process 200 for providing workload redundancy is shown in FIG. 2. It is best viewed in conjunction with FIG. 1. Process 200 begins at 202. At 204, the tail latency of ongoing computing processing may be measured and it may be determined whether or not the tail latency meets a target value.

If the tail latency does not meet the target value, then at 206, the workload redundancy may be increased by a factor "a", which may be a fractional increase in the workload redundancy. With the increased workload redundancy, system 100 may continue processing. In order to implement the workload redundancy, load replicator 104 may assign replication levels to incoming requests, such as requests R1 102-1 and R2 102-2, according to a. The replication levels may be assigned randomly to incoming requests, or the replication levels may be assigned based on non-random factors. For example, in order to achieve fractional replication factors, load replicator 104 may not replicate some requests, rather, load replicator 104 may select every α request to be replicated. As another example, load replicator 104 may replicate requests a times on average using a random number generator. As another example, load replicator 104 may replicate different requests with different frequency or different numbers of times. As another example, load replicator 104 may replicate requests stochastically by building a probability distribution having only integer values with the average equal to the target fractional replication factor. Then the probability distribution may be used to decide the replication factor for each request. As a further example, load replicator 104 may replicate requests deterministically by defining a sequence of replication factors with the average equal to the target fractional replication factor. Then this sequence may be used to decide the replication factor for each request. It is to be noted that the described replication schemes resources are merely examples. The present invention contemplates application of any type of replication scheme.

If the tail latency does meet the target value, then at 208, the workload redundancy may be maintained at the same value, or may be decreased. Decreasing the workload redundancy value at 208 and increasing the workload redundancy value at 206 may allow the system to automatically adjust the workload redundancy to meet the tail latency target value as incoming requests vary.

Figure 3:
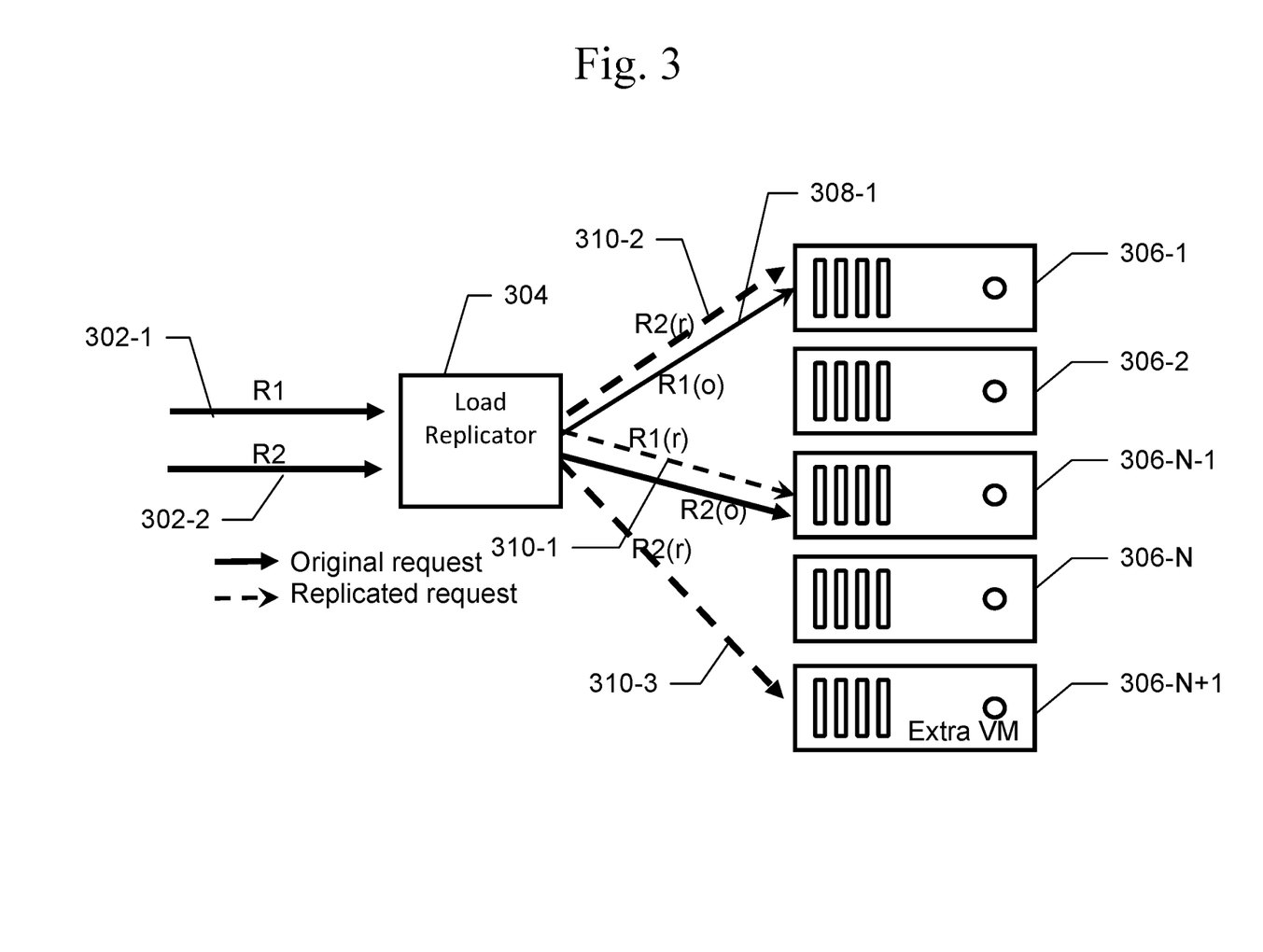
FIG. 3 is an exemplary block diagram of a computing system in which an embodiment of the present invention may be implemented.

An exemplary system 300 in which an embodiment of the present invention may be implemented is shown in FIG. 3. System 300 may include a plurality of incoming computing requests, such as requests R1 302-1 and R2 302-2, a load replicator 304, and a plurality of computing resources 306-1 to 306-N. In this example, resource redundancy is used in addition to workload redundancy. For example, additional resources, such as computing resources 306-N+1, which in this example is a virtual machine, may be provisioned to process requests when needed, and de-provisioned when not needed. Likewise, in this example, load replicator 304 may implement a fractional workload replication factor.

Figure 4:
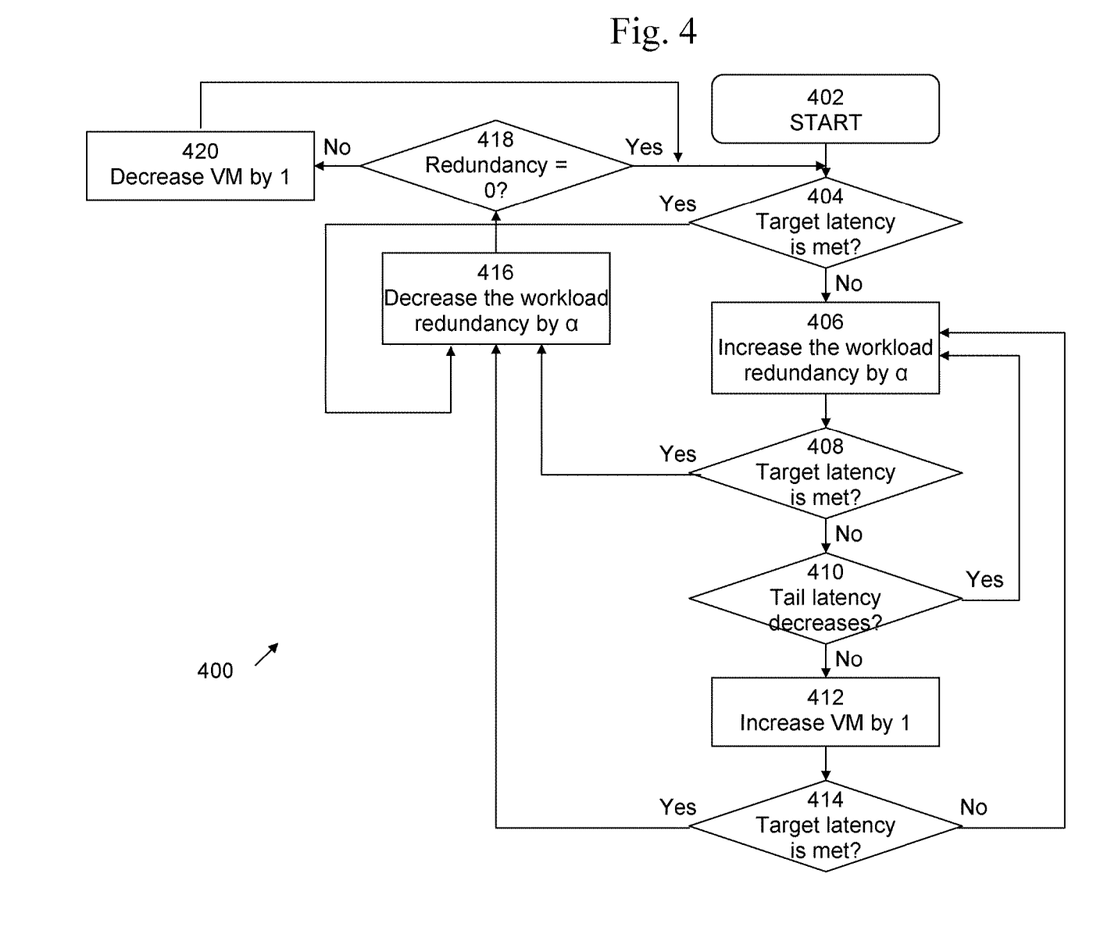
FIG. 4 is an exemplary flow diagram of a process for providing workload redundancy and resource redundancy in the computing system shown in FIG. 3.

An exemplary flow diagram of a process 400 for providing workload redundancy is shown in FIG. 4. It is best viewed in conjunction with FIG. 3. Process 400 begins at 402. At 404, the tail latency of ongoing computing processing may be measured and it may be determined whether or not the tail latency meets a target value.

If the tail latency does meet the target value, then process 400 proceeds to 416. If the tail latency does not meet the target value, then at 406, the workload redundancy may be increased by a factor "α", which may be a fractional increase in the workload redundancy. With the increased workload redundancy, system 300 may continue processing. In order to implement the workload redundancy, load replicator 304 may assign replication levels to incoming requests, such as requests R1 302-1 and R2 302-2, according to α. The replication levels may be assigned randomly to incoming requests, or the replication levels may be assigned based on non-random factors. For example, in order to achieve fractional replication factors, load replicator 304 may not replicate some requests, rather, load replicator 304 may replicate every α request. As another example, load replicator 304 may replicate requests a times on average using a random number generator. As a further example, load replicator 304 may replicate different requests with different frequency or different numbers of times. It is to be noted that the described replication schemes resources are merely examples. The present invention contemplates application of any type of replication scheme.

At 408, after the workload redundancy has been increased, the tail latency may again be measured and it may be determined whether or not the tail latency meets the target value. If the tail latency does meet the target value, then the process may proceed to 416. If the tail latency still does not meet the target value, then at 410, it is determined whether or not the tail latency decreases as a result of the increase in workload redundancy. If the tail latency did decrease as a result of the increase in workload redundancy, then the process may loop back to 406, in which the workload redundancy may be increased again. If the tail latency did not decrease as a result of the increase in workload redundancy, the process may continue to 412, in which the resource redundancy may be increased. For example, an additional virtual machine, such as virtual machine 306-N+1 may be provisioned to the processing task. Likewise, another server, or other computing resource may be provisioned to the processing task.

At 414, after the resource redundancy has been increased, the tail latency may again be measured and it may be determined whether or not the tail latency meets the target value. If the tail latency does meet the target value, then the process may proceed to 416. If the tail latency does not meet the target value, then the process may loop back to 406, in which the workload redundancy may be increased again.

At 416, the workload redundancy may be maintained at the same value, or may be decreased. At 418, it is determined whether or not the resource redundancy is zero. If the resource redundancy is zero, then the minimum allowed resources are provisioned to the processing task, and the process loops back to 404. If the resource redundancy is not zero, then at 420 the resource redundancy may be decreased. For example, a virtual machine, such as virtual machine 306-N+1 may be de-provisioned from the processing task. Likewise, another server, or other computing resource may be de-provisioned from the processing task. Decreasing the workload redundancy value at 416 and the resource redundancy at 420, and increasing the workload redundancy value at 406 and the resource redundancy at 412 may allow the system to automatically adjust the workload redundancy and the resource redundancy to meet the tail latency target value as incoming requests vary.

Figure 5:
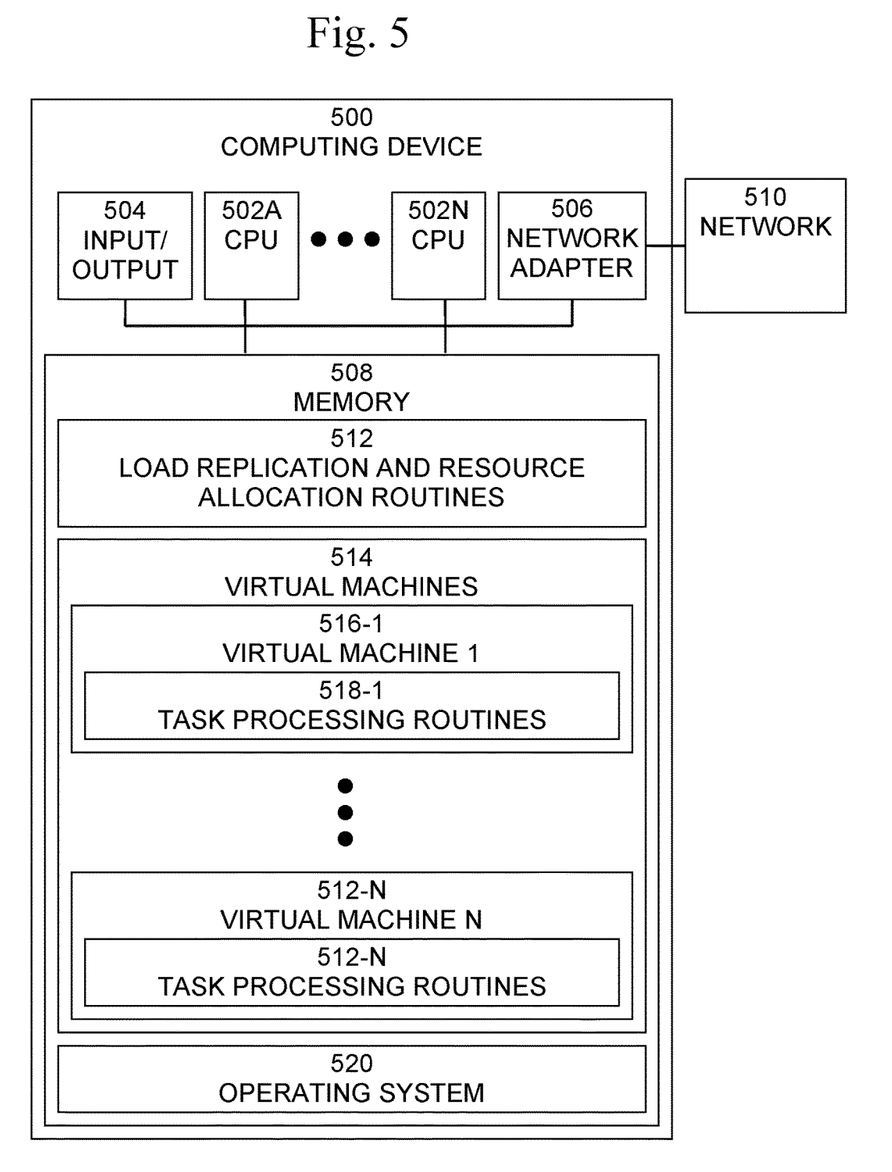
FIG. 5 is an exemplary block diagram of a computer system in which processes involved in the embodiments described herein may be implemented.

An exemplary block diagram of a computing device 500, in which processes involved in the embodiments described herein may be implemented, is shown in FIG. 5. Computing device 500 is typically a programmed general-purpose computer system, such as an embedded processor, system on a chip, personal computer, workstation, server system, and minicomputer or mainframe computer. Likewise, computing device 500 may be implemented in a wrist-worn, or other personal or mobile device, and may include sensor circuitry as well as display circuitry to display object identification information. Computing device 500 may include one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computing device 500 is implemented as a single multi-processor computer system, in which multiple processors 502A-502N share system resources, such as memory 508, input/output circuitry 504, and network adapter 506. However, the present invention also contemplates embodiments in which computing device 500 is implemented as a plurality of networked computer systems, which may be single-processor computer systems, multi-processor computer systems, or a mix thereof.

Input/output circuitry 504 provides the capability to input data to, or output data from, computing device 500. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to, the Internet.

Memory 508 stores program instructions that are executed by, and data that are used and processed by, CPU 502 to perform the functions of computing device 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computing device 500 is programmed to perform. In the example shown in FIG. 5, exemplary memory contents are shown representing routines and data for embodiments of the processes and systems described above. However, one of skill in the art would recognize that these routines, along with the memory contents related to those routines, may not be included on one system or device, but rather may be distributed among a plurality of systems or devices, based on well-known engineering considerations. The present invention contemplates any and all such arrangements.

In the example shown in FIG. 5, memory 508 may include load replication and resource provisioning routines 512, virtual machines 514, and operating system 520. For example, load replication and resource provisioning routines 512 may include routines that implement one or more of the processes shown in FIGS. 2 and 4. Load replication and resource provisioning routines 512 may include routines that receive incoming processing requests and transmit those requests, as well as replicated requests to one or more virtual machines 514, or to other servers or processing resources. Likewise, load replication and resource provisioning routines 512 may include routines that provision resources to processing tasks, such as one or more virtual machines 514, or other servers or processing resources. Further, load replication and resource provisioning routines 512 may include routines that perform the tail latency measurement, comparison to target tail latency values, and determination of increases or decreases in workload redundancy and/or resource redundancy as shown in one or more of FIGS. 2 and 4.

Virtual machines 514 may include program instructions and data to provide emulation of one or more computer systems, such as virtual machines 1 to N. Each virtual machine may include program instructions and data to perform processing of the computing tasks being provided. Operating system 520 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for performing computing processing comprising:
   receiving a plurality of requests for computing processing;
   replicating at least some of the plurality of requests, wherein the requests are replicated based on a fractional replication factor;
   transmitting each received request and each replicated request to a computer resource for processing;
   determining a tail latency for performing the requested computing processing; and
   incrementally increasing the fractional replication factor when the determined tail latency does not meet a target tail latency;
   wherein the replicating is performed by a process selected from a group of processes consisting of:
   replicating selected requests, wherein the requests are selected based on a replication factor;
   replicating requests a number of times on average based on a randomly generated quantity;
   replicating each request with a different frequency;
   replicating requests stochastically by building a probability distribution having only integer values with an average equal to the fractional replication factor and determining a replication factor for each request based on the probability distribution; and
   replicating requests deterministically by defining a sequence of replication factors with an average equal to the fractional replication factor and determining a replication factor for each request based on the sequence.

2. The method of claim 1, further comprising:
   decreasing the fractional replication factor when the determined tail latency meets the target tail latency.

3. The method of claim 1, further comprising:
   increasing computing resources provisioned to perform the processing when the determined tail latency does not meet the target tail latency and increasing the fractional replication factor does not result in a decrease in the determined tail latency.

4. The method of claim 3, wherein the computing resources comprise at least one of a virtual machine or a server.

5. The method of claim 3, further comprising:
decreasing the fractional replication factor when the determined tail latency meets the target tail latency; and
decreasing the computing resources provisioned to perform the processing when the fractional replication factor has been decreased and the provisioned computing resources have been increased.

6. A computer program product for performing computing processing, the computer program product comprising a non-transitory computer readable storage having program instructions embodied therewith, the program instructions executable by a computer, to cause the computer to perform a method comprising:
receiving a plurality of requests for computing processing;
replicating at least some of the plurality of requests, wherein the requests are replicated based on a fractional replication factor;
transmitting each received request and each replicated request to a computer resource for processing;
determining a tail latency for performing the requested computing processing; and
incrementally increasing the fractional replication factor when the determined tail latency does not meet a target tail latency;
wherein the replicating is performed by a process selected from a group of processes consisting of:
replicating selected requests, wherein the requests are selected based on a replication factor;
replicating requests a number of times on average based on a randomly generated quantity;
replicating each request with a different frequency;
replicating requests stochastically by building a probability distribution having only integer values with an average equal to the fractional replication factor and determining a replication factor for each request based on the probability distribution; and
replicating requests deterministically by defining a sequence of replication factors with an average equal to the fractional replication factor and determining a replication factor for each request based on the sequence.

7. The computer program product of claim 6, further comprising program instructions for:
decreasing the fractional replication factor when the determined tail latency meets the target tail latency.

8. The computer program product of claim 7, further comprising program instructions for:
increasing computing resources provisioned to perform the processing when the determined tail latency does not meet the target tail latency and increasing the fractional replication factor does not result in a decrease in the determined tail latency.

9. The computer program product of claim 8, wherein the computing resources comprise at least one of a virtual machine or a server.

10. The computer program product of claim 8, further comprising program instructions for:
decreasing the fractional replication factor when the determined tail latency meets the target tail latency; and
decreasing the computing resources provisioned to perform the processing when the fractional replication factor has been decreased and the provisioned computing resources have been increased.

11. A system for performing computing processing, the system comprising a processor, memory accessible by the processor, and computer program instructions stored in the memory and executable by the processor to perform:
receiving a plurality of requests for computing processing;
replicating at least some of the plurality of requests, wherein the requests are replicated based on a fractional replication factor;
transmitting each received request and each replicated request to a computer resource for processing, determining a tail latency for performing the requested computing processing; and
incrementally increasing the fractional replication factor when the determined tail latency does not meet a target tail latency;
wherein the replicating is performed by a process selected from a group of processes consisting of:
replicating selected requests, wherein the requests are selected based on a replication factor;
replicating requests a number of times on average based on a randomly generated quantity;
replicating each request with a different frequency;
replicating requests stochastically by building a probability distribution having only integer values with an average equal to the fractional replication factor and determining a replication factor for each request based on the probability distribution; and
replicating requests deterministically by defining a sequence of replication factors with an average equal to the fractional replication factor and determining a replication factor for each request based on the sequence.

12. The system of claim 11, further comprising computer program instructions for: decreasing the fractional replication factor when the determined tail latency meets the target tail latency.

13. The system of claim 11, further comprising computer program instructions for:
increasing computing resources provisioned to perform the processing when the determined tail latency does not meet the target tail latency and increasing the fractional replication factor does not result in a decrease in the determined tail latency.

14. The system of claim 13, wherein the computing resources comprise at least one of a virtual machine or a server.

15. The system of claim 13, further comprising computer program instructions for:
decreasing the fractional replication factor when the determined tail latency meets the target tail latency; and
decreasing the computing resources provisioned to perform the processing when the fractional replication factor has been decreased and the provisioned computing resources have been increased.

16. A system for performing computing processing, comprising:
a plurality of computing resources adapted to perform computing processing; and
a load replicator adapted to:
receive a plurality of requests for computing processing, replicate at least some of the plurality of requests, wherein the requests are replicated based on a fractional replication factor, transmit each received request and each replicated request to a computer resource for processing, determine a tail latency for performing the requested computing processing; and incrementally increase the fractional replication factor when the determined tail latency does not meet a target tail latency;

wherein the replicating is performed by a process selected from a group of processes consisting of:

replicating selected requests, wherein the requests are selected based on a replication factor;

replicating requests a number of times on average based on a randomly generated quantity;

replicating each request with a different frequency;

replicating requests stochastically by building a probability distribution having only integer values with an average equal to the fractional replication factor and determining a replication factor for each request based on the probability distribution; and replicating requests deterministically by defining a sequence of replication factors with an average equal to the fractional replication factor and determining a replication factor for each request based on the sequence.

17. The system of claim 16, wherein the load replicator is further adapted to:

increase computing resources provisioned to perform the processing when the when the determined tail latency does not meet the target tail latency and increasing the fractional replication factor does not result in a decrease in the determined tail latency;

decrease the fractional replication factor when the determined tail latency meets the target tail latency; and decrease the computing resources provisioned to perform the processing when the fractional replication factor has been decreased and the provisioned computing resources have been increased;

wherein the computing resources comprise at least one of a virtual machine or a server.

* * * * *